W. F. BROWN.
PLATE LIFTER.
APPLICATION FILED FEB. 26, 1910.
972,055.
Patented Oct. 4, 1910.
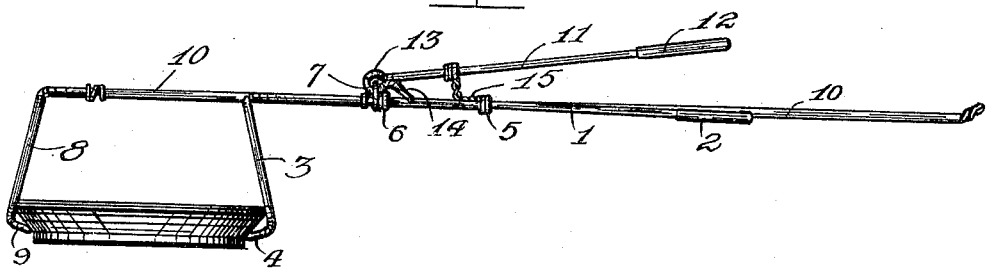
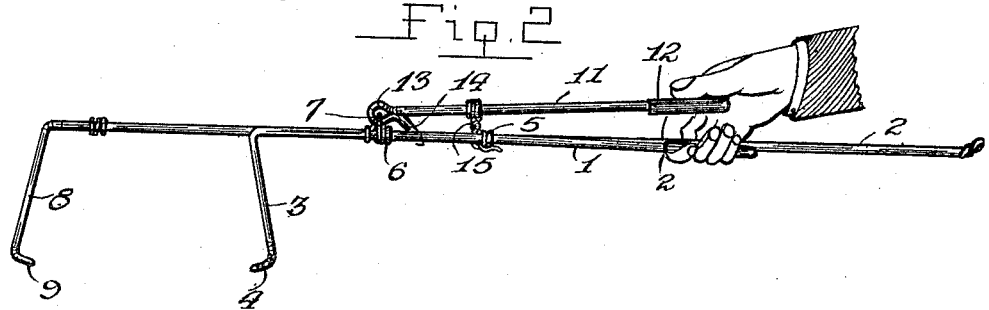
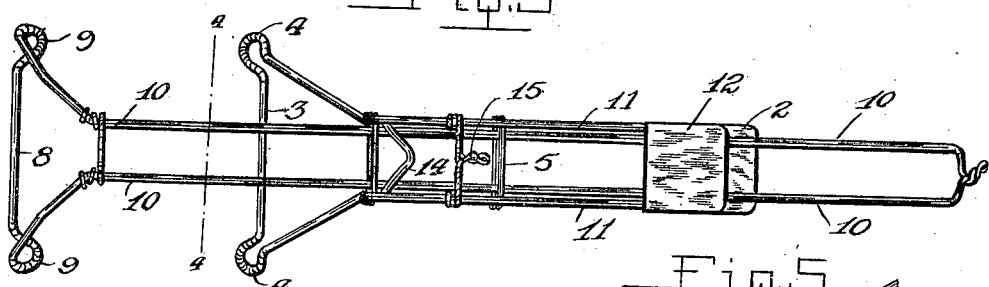
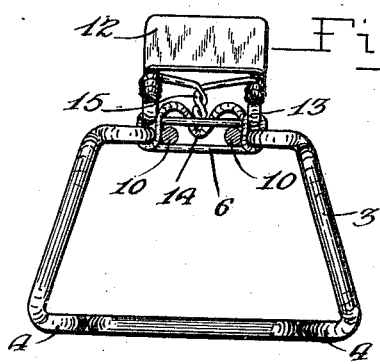
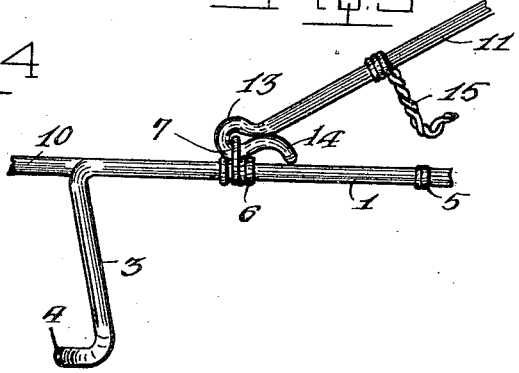
Witnesses
Chas. Justice.
H. C. Schroeder
Inventor.
William F. Brown,
By E. E. Vrooman, Atty.

UNITED STATES PATENT OFFICE.

WILLIAM F. BROWN, OF OAKLAND, CALIFORNIA.

PLATE-LIFTER.

972,055. Specification of Letters Patent. Patented Oct. 4, 1910.

Application filed February 26, 1910. Serial No. 546,201.

*To all whom it may concern:*

Be it known that I, WILLIAM F. BROWN, a citizen of the United States, residing at Oakland, in the county of Alameda and State of California, have invented certain new and useful Improvements in Plate-Lifters, of which the following is a specification.

This invention relates to plate lifters, and the principal object of the same is to provide a lifter that may be firmly engaged with a dish, pan or other utensils to lift the same so that the hand of the user will not contact therewith.

The invention is primarily intended for use in connection with hot utensils and is provided with a pair of gripping jaws that are relatively adjustable to adapt the lifter for use in connection with different sizes of utensils, means being provided for locking the jaws in their adjusted position, said means being controlled by the user.

In carrying out the objects of the invention generally stated above it will be understood, of course, that the essential features thereof are necessarily susceptible of changes in details and structural arrangements, one preferred and practical embodiment of which is shown in the accompanying drawings, wherein:—

Figure 1 is a view in side elevation of the improved lifter, the jaws being shown in engagement with a utensil but not locked. Fig. 2 is a view in side elevation showing the jaws locked. Fig. 3 is a top plan view. Fig. 4 is a vertical sectional view taken on the line 4—4, Fig. 3. Fig. 5 is an enlarged fragmentary view in side elevation showing the means for locking the adjustable jaws.

The improved lifter comprises a handle that is formed of a single length of wire bent to provide a pair of side members 1 that are arranged in spaced parallel relation and in the same plane, the rear end of said handle being preferably covered by a strip of sheet metal 2 which prevents the wires injuring the hands of the user. At the forward end of the handle, the side members 1 diverge and depend at right angle to provide a pendent gripping jaw 3 the ends 4 of which project in a forward direction and in a plane substantially parallel with the side members 1 so that they may be placed beneath the utensil to be lifted. Intermediate their length the side members 1 are connected by a guide loop 5 which prevents relative movement of said members, and adjacent their divergent forward ends, said members are connected by another guide loop 6. Said loop 6, at its ends, is provided with upstanding pivot ears 7.

An outer jaw 8, which is similar to jaw 3 is provided with rearwardly projecting ends 9 for engagement with the bottom of a utensil in a manner similar to that described in connection with jaw 3 but obviously at an opposite portion. Said jaw is integral with an elongated slide member and said jaw and slide members are formed of a single length of wire which is shaped to provide the spaced parallel side members 10 from whose forward end jaw 9 depends, the rear ends of said members 10 being twisted or otherwise fastened together. Members 10 are slidably mounted in guide loops 5 and 6 to permit jaw 9 to be adjusted relatively to jaw 3.

A lever is employed for locking the handle and the slide member together, said lever being formed of a single length of wire shaped to provide the spaced parallel side members 11 which are covered at their rear by a strip of sheet metal 12 in a similar manner and for the same purpose as that described in connection with the side members of the handle. The forward ends of members 11 are provided with ears 13 and from said ears the material of which said lever is formed is bent at substantially right angles to provide a lip 14 which is preferably V-shaped and adapted to be forced into binding engagement with the sides 10 of the elongated slide by rocking the lever toward the handle.

In use, the slide member is adjusted relatively to the handle so that its jaw 8 may be engaged with a portion of a utensil opposite to that engaged by jaw 3, as is shown in Fig. 1, and by grasping the lifter by the handle and the locking lever, as shown in Fig. 2, jaws 3 and 8 are locked against relative movement so that the utensil may be readily lifted without danger of slipping.

In some instances it is advisable to retain the lifter in engagement with the utensil after the user has released the same, and to permit the same to be accomplished the side members of the locking lever carry a hook 15 that is slidably connected to said members and is adapted to be engaged with guide loop 5 so that the locking lip 14 will be retained in binding engagement with the side members 10 of the slide. Said hook is preferably formed of a single length of wire the ends of which are twisted about said side members, the wire being then twisted together to provide the hook 15.

What I claim as my invention is:—

1. A plate lifter comprising a handle provided with a jaw at one end, a slide carried by said handle and provided with a jaw at one end, said slide having its bottom portion formed of relatively spaced side members, and a lever pivotally connected to said handle and provided with a handgrip complemental to said handle and a locking lip adapted to be forced between the side members of said slide to lock the same to the handle.

2. A plate lifter comprising a handle provided with a gripping jaw at one end, guides carried by said handle, a slide mounted in said guides and provided with a gripping jaw at one end, a lever pivotally connected to said handle and provided with a handgrip complemental to said handle and a lip for locking engagement with said slide, and a hook adjustably connected to said slide and adapted for engagement with one of the guides of said handle.

3. A plate lifter comprising a handle and a gripping jaw formed of a single length of wire, a slide and a gripping jaw also formed of a single length of wire, means for adjustably connecting said slide to said handle, and a lever and a locking lip formed of a single length of wire, said lever provided with a handgrip complemental to said handle and adapted for pivotal engagement with said handle and said lip adapted for binding engagement with said slide.

4. A plate lifter comprising a handle, a gripping jaw carried thereby, guiding means carried by said handle, a slide adjustably engaging said guiding means, a gripping jaw carried by said slide, a lever pivotally connected to said handle and provided with a handgrip, a lip carried by said lever and adapted for locking engagement with said slide, and a hook carried by said lever adapted for engagement with said handle.

In testimony whereof I affix my signature in presence of two witnesses.

WILLIAM F. BROWN.

Witnesses:
H. C. SCHROEDER,
F. P. SCHROEDER.